(12) United States Patent
Hayakawa et al.

(10) Patent No.: US 7,952,813 B2
(45) Date of Patent: May 31, 2011

(54) ZOOM LENS SYSTEM AND ELECTRONIC IMAGING APPARATUS THAT USES THE SAME

(75) Inventors: Koichiro Hayakawa, Saitama (JP); Masaru Eguchi, Saitama (JP)

(73) Assignee: Hoya Corporation, Tokyo (JP)

( * ) Notice: Subject to any disclaimer, the term of this patent is extended or adjusted under 35 U.S.C. 154(b) by 99 days.

(21) Appl. No.: 12/420,980

(22) Filed: Apr. 9, 2009

(65) Prior Publication Data
US 2009/0257132 A1 Oct. 15, 2009

(30) Foreign Application Priority Data

Apr. 11, 2008 (JP) ................................. 2008-103373

(51) Int. Cl.
*G02B 15/14* (2006.01)
(52) U.S. Cl. ........................................ 359/689; 359/676
(58) Field of Classification Search .................. 359/689, 359/676, 686
See application file for complete search history.

(56) References Cited

U.S. PATENT DOCUMENTS

| | | | |
|---|---|---|---|
| 6,917,476 B2 | 7/2005 | Eguchi | |
| 2004/0032670 A1* | 2/2004 | Eguchi | ........................ 359/687 |
| 2005/0057817 A1 | 3/2005 | Ori | |
| 2005/0057819 A1 | 3/2005 | Eguchi | |
| 2007/0171544 A1 | 7/2007 | Noda | |
| 2008/0158690 A1 | 7/2008 | Eguchi | |
| 2008/0252993 A1 | 10/2008 | Eguchi | |
| 2009/0034090 A1 | 2/2009 | Eguchi | |
| 2009/0034092 A1 | 2/2009 | Eguchi | |

FOREIGN PATENT DOCUMENTS

| | | |
|---|---|---|
| JP | 2004-4765 | 1/2004 |
| JP | 2005-84597 | 3/2005 |
| JP | 2007-193140 | 8/2007 |
| JP | 2008-181118 | 8/2008 |

* cited by examiner

*Primary Examiner* — Joseph Martinez
*Assistant Examiner* — James R Greece
(74) *Attorney, Agent, or Firm* — Greenblum & Bernstein P.L.C.

(57) ABSTRACT

A zoom lens system includes a negative first lens group, a positive second lens group, and a positive third lens group, in this order from the object.
Each of the negative first lens group, the positive second lens group and the positive third lens group moves along the optical axis upon zooming.
The positive second lens group includes a positive first lens element, a negative second lens element, and a negative third lens element, in this order from the object.
The zoom lens system satisfies the following conditions:

$2 < f2/rb < 3$ (1)

$0.4 < f2/f3 < 0.8$ (2)

wherein
f2 designates the focal length of the positive second lens group;
f3 designates the focal length of the positive third lens group; and
rb designates the radius of curvature of the image-side surface of the negative third lens element of the positive second lens group.

7 Claims, 11 Drawing Sheets

Fig. 1

Fig. 2A
FNo.=1:3.1

— d Line
---- g Line
--- C Line

- 0.15    0.15
SPHERICAL
ABERRATION
CHROMATIC
ABERRATION

Fig. 2B
W=32.2

- 0.01    0.01
LATERAL
CHROMATIC
ABERRATION

- 0.1    0.1
ASTIGMATISM

Fig. 2D
W=32.2

-5 (%) 5
DISTORTION

Fig. 3A
FNo.=1:4.1

— d Line
---- g Line
--- C Line

- 0.15   0.15
SPHERICAL
ABERRATION
CHROMATIC
ABERRATION

Fig. 3B
W=19.7

- 0.01   0.01
LATERAL
CHROMATIC
ABERRATION

- 0.1   0.1
ASTIGMATISM

Fig. 3D
W=19.7

-5  (%)  5
DISTORTION

Fig. 4A
FNo.=1:5.8

— d Line
---- g Line
--- C Line

- 0.15   0.15
SPHERICAL
ABERRATION
CHROMATIC
ABERRATION

Fig. 4B
W=11.3

- 0.01   0.01
LATERAL
CHROMATIC
ABERRATION

- 0.1   0.1
ASTIGMATISM

Fig. 4D
W=11.3

-5  (%)  5
DISTORTION

Fig.5

Fig. 6A
FNo.=1:3.1

— d Line
---- g Line
---- C Line

- 0.15    0.15
SPHERICAL
ABERRATION
CHROMATIC
ABERRATION

Fig. 6B
W=31.8

- 0.01   0.01
LATERAL
CHROMATIC
ABERRATION

- 0.1    0.1
ASTIGMATISM

Fig. 6D
W=31.8

-5 (%) 5
DISTORTION

Fig. 7A
FNo.=1:4.1
— d Line
······ g Line
— — C Line
- 0.15  0.15
SPHERICAL
ABERRATION
CHROMATIC
ABERRATION Fig. 7B
W=19.6
- 0.01  0.01
LATERAL
CHROMATIC
ABERRATION Fig. 7C
W=19.6
— S
— — M
- 0.1  0.1
ASTIGMATISM Fig. 7D
W=19.6
-5 (%) 5
DISTORTION Fig. 8A
FNo.=1:5.8
— d Line
······ g Line
— — C Line
- 0.15  0.15
SPHERICAL
ABERRATION
CHROMATIC
ABERRATION Fig. 8B
W=11.3
- 0.01  0.01
LATERAL
CHROMATIC
ABERRATION Fig. 8C
W=11.3
— S
— — M
- 0.1  0.1
ASTIGMATISM Fig. 8D
W=11.3
-5 (%) 5
DISTORTION

Fig. 9

Fig. 10A
FNo.=1:3.1

— d Line
······ g Line
– – C Line

-0.15  0.15

SPHERICAL
ABERRATION
CHROMATIC
ABERRATION

LATERAL
CHROMATIC
ABERRATION

ASTIGMATISM

DISTORTION

Fig. 11A
FNo.=1:4.1

- 0.15    0.15
SPHERICAL
ABERRATION

CHROMATIC
ABERRATION

Fig. 11B
W=19.8

- 0.01   0.01
LATERAL
CHROMATIC
ABERRATION

Fig. 11C
W=19.8

- 0.1    0.1
ASTIGMATISM

Fig. 11D
W=19.8

-5 (%) 5
DISTORTION

Fig. 12A
FNo.=1:5.8

- 0.15   0.15
SPHERICAL
ABERRATION

CHROMATIC
ABERRATION

Fig. 12B
W=11.3

- 0.01   0.01
LATERAL
CHROMATIC
ABERRATION

Fig. 12C
W=11.3

- 0.1    0.1
ASTIGMATISM

Fig. 12D
W=11.3

-5 (%) 5
DISTORTION

Fig.13

Fig. 14A
FNo.=1:3.0

— d Line
······ g Line
– – C Line

-0.15   0.15
SPHERICAL
ABERRATION
CHROMATIC
ABERRATION

Fig. 14B
W=33.0

-0.01   0.01
LATERAL
CHROMATIC
ABERRATION

-0.1   0.1
ASTIGMATISM

Fig. 14D
W=33.0

-5 (%) 5
DISTORTION

Fig. 15A FNo.=1:4.0 — SPHERICAL ABERRATION CHROMATIC ABERRATION (d Line, g Line, C Line), -0.15 0.15

Fig. 15B W=19.8 — LATERAL CHROMATIC ABERRATION, -0.01 0.01

Fig. 15C W=19.8 — ASTIGMATISM (S, M), -0.1 0.1

Fig. 15D W=19.8 — DISTORTION, -5 (%) 5

Fig. 16A FNo.=1:5.6 — SPHERICAL ABERRATION CHROMATIC ABERRATION (d Line, g Line, C Line), -0.15 0.15

Fig. 16B W=11.6 — LATERAL CHROMATIC ABERRATION, -0.01 0.01

Fig. 16C W=11.6 — ASTIGMATISM (S, M), -0.1 0.1

Fig. 16D W=11.6 — DISTORTION, -5 (%) 5

Fig. 17

Fig. 18A
FNo.= 1:3.1

— d Line
······ g Line
--- C Line

-0.15  0.15
SPHERICAL ABERRATION
CHROMATIC ABERRATION

Fig. 18B
W=32.1

-0.01  0.01
LATERAL CHROMATIC ABERRATION

-0.1  0.1
ASTIGMATISM

Fig. 18D
W=32.1

-5 (%) 5
DISTORTION

Fig.21

ZOOM LENS SYSTEM AND ELECTRONIC IMAGING APPARATUS THAT USES THE SAME

BACKGROUND OF THE INVENTION

1. Field of the Invention

The present invention relates to a low-cost zoom lens system having a zoom ratio of approximately 3, and which is to be used in a small, light-weight digital camera. The present invention also relates to an electronic imaging apparatus which uses such a zoom lens system.

2. Description of Related Art

Along with rapidly increasing popularity of digital cameras in recent years, there has been a demand for lower-cost digital cameras, and there is also a strong demand for lower costs in regard to the photographing optical systems thereof. Furthermore, compact digital cameras which are miniaturized and made slimmer so as to have superior portability, tend to be more popular. On the other hand, every year the number of pixels of solid-state image sensors such as CCDs, etc., increases, so that a high-quality photographing optical system which is compatible with a fine pixel pitch is in demand.

A negative-lead type zoom lens system is often used in a zoom lens system having a zoom ratio of approximately 3 as a zoom lens system for a compact digital camera. Since a negative-lead type zoom lens system can widen the angle-of-view at the short focal length extremity and miniaturize the lens system (especially the diameter of the frontmost lens group), a negative-lead type zoom lens system is suitable for the so-called retractable zoom lens camera which accommodates the lens groups by reducing the distances therebetween when retracting the lens groups to an accommodating position. Furthermore, due to the need to position the exit pupil sufficiently far away from the imaging plane, a three-lens-group zoom lens system, i.e., a first lens group having a negative refractive power (hereinafter, a negative first lens group), a second lens group having a positive refractive power (hereinafter, a positive second lens group) and a third lens group having a positive refractive power (hereinafter, a positive third lens group) is often employed (e.g., see Japanese Unexamined Patent Publication Nos. 2005-84597 (Document 1) and 2007-193140 (Document 2)).

In Documents 1 and 2, relatively small negative-lead type zoom lens systems having a negative lens group, a positive lens group, and a positive lens group, in this order from the object, and a zoom ratio of approximately 3 have been proposed. However, these optical systems have long overall length and thick lens groups, which do not satisfy requirements for miniaturization. Furthermore, cost reduction is not sufficiently achieved. In a retractable zoom lens system, if an attempt is made to achieve further miniaturization in a fully-retracted state, in addition to reducing the overall length of the optical system and the lens diameter in a photographing position, the lens thicknesses of each lens group also needs to be reduced. However, such miniaturization is disadvantageous for the correcting of aberrations. Accordingly, it is a challenging problem to achieve the best possible balance between miniaturization and high specifications.

SUMMARY OF THE INVENTION

The present invention provides a negative-lead type zoom lens system which includes three lens groups, and has a zoom ratio of approximately 3 can cover a zooming range from the wide-angle extremity (the short focal length extremity) to the telephoto extremity (the long focal length extremity).

According to a first aspect of the present invention, there is provided a zoom lens system including a negative first lens group, a positive second lens group, and a positive third lens group, in this order from the object.

Each of the negative first lens group, the positive second lens group and the positive third lens group moves along the optical axis upon zooming.

The positive second lens group includes a positive first lens element, a negative second lens element, and a negative third lens element, in this order from the object.

The zoom lens system satisfies the following conditions:

$$2 < f2/rb < 3 \qquad (1)$$

$$0.4 < f2/f3 < 0.8 \qquad (2)$$

wherein f2 designates the focal length of the positive second lens group;

f3 designates the focal length of the positive third lens group; and rb designates the radius of curvature of the image-side surface of the third lens element of the positive second lens group.

The zoom lens system of the first aspect of the present invention preferably satisfies the following condition:

$$1.8 < n1 \qquad (3)$$

wherein n1 designates the refractive index of the d-line of the first lens element of the positive second lens group.

According to a second aspect of the present invention, there is provided a zoom lens system including a negative first lens group, a positive second lens group, and a positive third lens group, in this order from the object.

Each of the negative first lens group, the positive second lens group and the positive third lens group moves along the optical axis upon zooming.

The positive second lens group includes a positive first lens element, a negative second lens element, and a negative third lens element, in this order from the object, and satisfies the following condition:

$$1.8 < n1 \qquad (3)$$

wherein n1 designates the refractive index of the d-line of the first lens element of the positive second lens group.

In either of the first aspect or the second aspect of the present invention, the zoom lens system preferably satisfies the following conditions:

$$-2 < f2/fa < -0.5 \qquad (4)$$

$$vd < 28 \qquad (5)$$

wherein fa designates the focal length of the third lens element of the positive second lens group; and vd designates the Abbe number of the third lens element of the positive second lens group.

In either of the first aspect or the second aspect of the present invention, both surfaces of the third lens element of the positive second lens group are preferably made aspherical.

In either of the first aspect or the second aspect of the present invention, upon zooming from the short focal length extremity to the long focal length extremity, the positive third lens group is monotonically moved toward the image, and preferably satisfies the following condition:

$$1.05 < m3t/m3w < 1.3 \quad (6)$$

wherein m3t designates the image-forming magnification of the positive third lens group at the long focal length extremity when the object at infinity is in an in-focus state; and m3w designates the image-forming magnification of the positive third lens group at the short focal length extremity when the object at infinity is in an in-focus state.

The positive third lens group is preferably constituted by a biconvex single lens element which is made from resin, and functions as a focusing lens group which is arranged to move, in the optical axis direction, for bringing an object (at a closer distance) in an in-focus state.

According to another aspect of the present invention, there is provided an electronic imaging apparatus including an imaging device on which an image is formed by the zoom lens system according to the present invention.

The present disclosure relates to subject matter contained in Japanese Patent Application No. 2008-103373 (filed on Apr. 11, 2008) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 21:
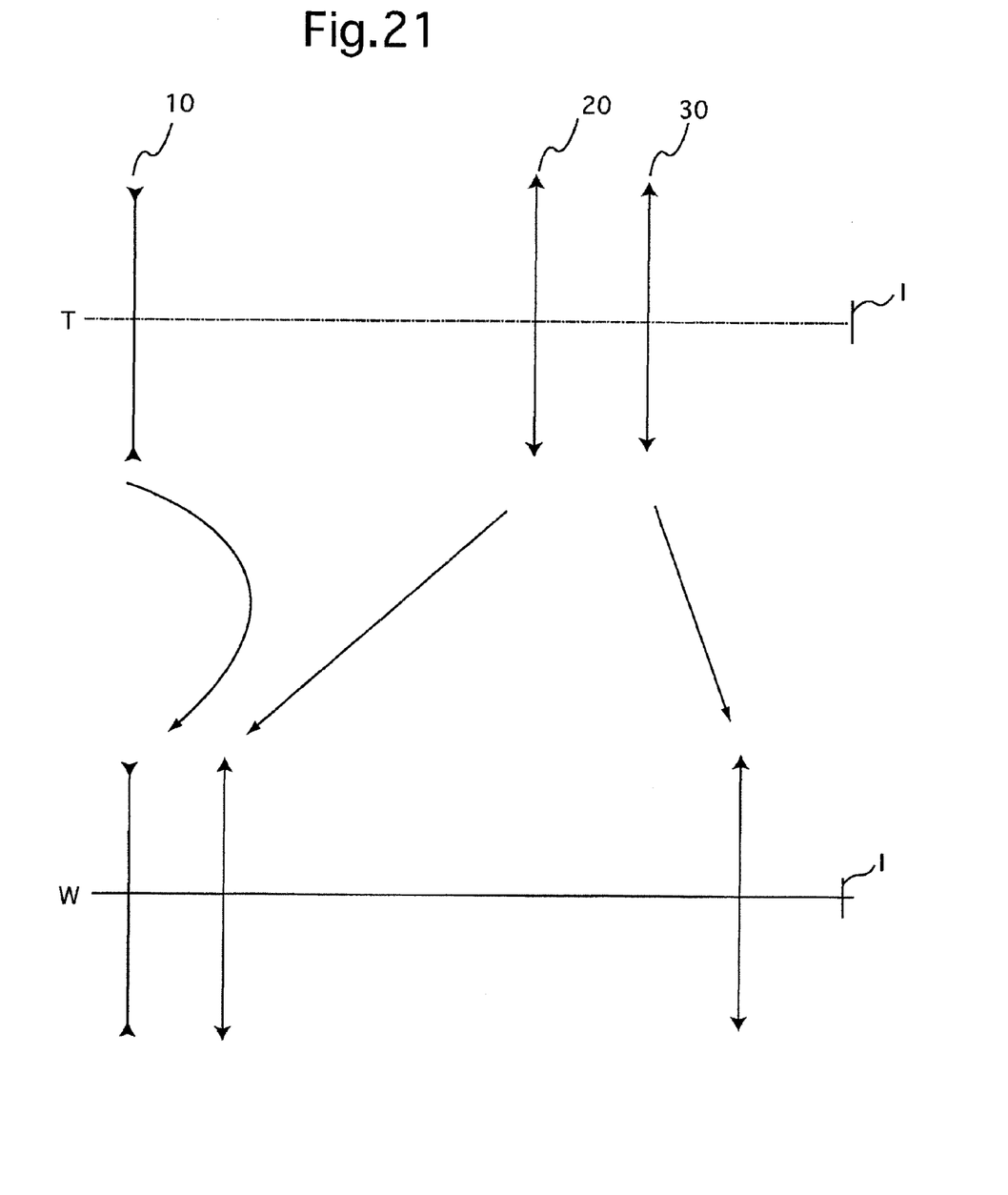
FIG. 21 is a schematic lens-group moving paths of the zoom lens system, according to the present invention.

The zoom lens system of the present invention, as shown in the zoom path of FIG. 21, includes a negative first lens group 10, a positive second lens group 20, and a positive third lens group 30, in this order from the object.

Upon zooming from the short focal length extremity (W) to the long focal length extremity (T), each of the negative first lens group 10, the positive second lens group 20 and the positive third lens group 30 moves along the optical axis.

More specifically, upon zooming from the short focal length extremity to the long focal length extremity, the negative first lens group 10 first moves toward the image, and thereafter moves toward the object; the positive second lens group 20 moves monotonically toward the object; and the positive third lens group 30 moves monotonically toward the image.

Focusing is carried out by the positive third lens group 30.

The designator 'I' designates an image plane.

Due to the above-explained lens-group arrangement, by performing zooming by moving each of the three lens groups, i.e., the negative first lens group 10, the positive second lens group 20 and the positive third lens group 30 in the above-described manner, a higher zoom ratio can be achieved.

As shown in each of the embodiments of FIGS. 1, 5, 9, 13 and 17, the negative first lens group 10 includes a negative first lens element 11 and a positive second lens element 12, in this order from the object; the positive second lens group 20 includes a positive third lens element (a positive first lens element) 21, a negative fourth lens element (a negative second lens element) 22, and a negative fifth lens element (a negative third lens element) 23, in this order from the object; and the positive third lens group 30 includes a positive single biconvex lens element 31.

The positive third lens element 21 and the negative fourth lens element 22 are cemented together, in this order from the object.

A cover glass (filter group) C is provided in front of an imaging device.

In a digital camera optical system which uses a solid-state image sensor such as a CCD, etc., telecentricity is required; however, this requirement is disadvantageous when miniaturization of the optical system is required. In order to reduce the length of the entire optical system while maintaining telecentricity, it is necessary to determine suitable refractive power for each lens group and to determine a suitable lens arrangement.

In the present invention, the height of a bundle of the off-axis light rays from the optical axis at the short focal length extremity is increased by forming the most image-side surface of the positive second lens group 20 (i.e., the most image-side surface of the fifth lens element 23) as a concave divergent surface; both telecentricity of the zoom lens system and the reduction in length thereof are achieved by refracting a bundle of light rays by the positive third lens group 30 having a relatively strong refractive power so that the bundle of light rays is parallel to the optical axis; and the zoom lens system preferably satisfies conditions (1) and (2).

Condition (1) specifies the ratio of the refractive power of the positive second lens group 20 to that of the image-side surface of the negative fifth lens element 23 in order to reduce the overall length of the zoom lens system.

If f2/rb exceeds the lower limit of condition (1), the diverging effect of the off-axis light rays at the short focal length extremity decreases. Consequently, the overall length of the zoom lens system cannot sufficiently be shortened.

If the off-axis light rays are diverged to the extent that f2/rb exceeds the upper limit of condition (1), it becomes difficult to maintain telecentricity.

Condition (2) specifies the refractive power of the positive second lens group 20 with respect to the positive third lens group 30. Namely, this condition is provided for maintaining telecentricity, i.e., off-axis light rays emitted from the final surface (the most image-side surface of the fifth element 23) of the positive second lens group 20 are made parallel with the optical axis by the positive refractive power of the positive third lens group 30.

If f2/f3 exceeds the lower limit of condition (2), the refractive power of the positive third lens group 30 becomes weaker. Consequently, it becomes difficult to maintain telecentricity, while miniaturization of the zoom lens system is achieved.

If f2/f3 exceeds the upper limit of condition (2), the refractive power of the positive third lens group 30 becomes stronger. Consequently, the change in optical quality at close distances upon focusing undesirably increases.

In a negative-lead type zoom lens system, in order to reduce the overall length thereof, the refractive power of each lens group can be increased, and the traveling distance of each lens group upon zooming can be reduced. However, if the refractive power is made too strong, the amount of aberrations on each refractive surface increases, so that the correcting of aberrations becomes difficult.

In the present invention, the positive second lens group 20 is constituted by three lens elements, i.e., the positive third lens element 21, the negative fourth lens element 22 and the negative fifth lens element 23, in this order from the object; and the positive third lens element 21 which is the only positive lens element preferably satisfies condition (3).

If n1 exceeds the lower limit of condition (3), the Petzval Sum becomes larger when the overall length of the zoom lens system is shortened, which makes it difficult to correct field curvature.

Conditions (4) and (5) are provided for adequately correcting chromatic aberration in the zoom range from the short focal length extremity to the long focal length extremity.

Condition (4) specifies the ratio of the refractive power of the positive second lens group 20 to that of the negative fifth lens element 23.

If the refractive power of the negative fifth lens element 23 becomes stronger to the extent that f2/fa exceeds the lower limit of condition (4), the focal sensitivity due to changes in temperature becomes undesirably higher, in the case where the negative fifth lens element 23 is formed from resin in order to reduce costs.

Furthermore, lateral chromatic aberration at the short focal length extremity and axial chromatic aberration at the long focal length extremity become overcorrected, so that it becomes difficult to provide a higher resolution.

If the refractive power of the negative fifth lens element 23 becomes weaker to the extent that f2/fa exceeds the upper limit of condition (4), the correcting of the lateral chromatic aberration from the short focal length extremity to the long focal length extremity becomes undesirably undercorrected.

Condition (5) determines the Abbe number of the negative fifth lens element 23. As described above, it is necessary for the negative fifth lens element 23 to have a relatively weak refractive power. Furthermore, it is necessary for the negative fifth lens element 23 to satisfy condition (5) in order to correct chromatic aberrations.

If vd exceeds the upper limit of condition (5), chromatic aberration from the short focal length extremity to the long focal length extremity becomes worse, and axial chromatic aberration in particular becomes undercorrected. Consequently, it is difficult to achieve a higher resolution.

The negative fifth lens element 23 is preferably a resin lens element having an aspherical surface in order to provide a higher optical quality and reduce cost. This aspherical surface corrects spherical aberration and coma over the entire zooming range.

Specifically, by making both surfaces of the negative fifth lens element 23 aspherical to distribute the burden of the correcting of aberrations, the amount of aberrations occurred on each surface can be reduced, so that sensitivity on deterioration of optical quality caused by decentration at the time of assembly can be reduced.

In the zoom lens system of the present invention, the zoom ratio is increased by moving the positive third lens group 30 toward the image upon zooming from the short focal length extremity to the long focal length extremity in order to compensate for the zoom ratio which tends to be insufficient when the overall length of the zoom lens system is shortened. In other words, a feature of the present invention is that the positive third lens group 30 is moved in the optical axis direction in order to perform zooming as well as the negative first lens group 10 and the positive second lens group 20 are moved.

Condition (6) specifies the ratio of the image-forming magnification at the long focal length extremity to the image-forming magnification at the short focal length extremity.

If m3t/m3w exceeds the lower limit of condition (6), an increase of the image-forming magnification of the positive third lens group 30 from the short focal length extremity to the long focal length extremity is smaller. Consequently, it is either difficult to attain a desired zoom ratio, or the burden of zooming on the positive second lens group 20 becomes greater.

If m3t/m3w exceeds the upper limit of condition (6), the traveling distance of the positive third lens group 30 upon zooming becomes longer. Consequently, there is a need to make the positive refractive power of the positive third lens group 30 stronger in order not to cause lack of the back focal distance at the long focal length extremity. To eliminate such a lack of the back focal distance, the positive refractive power of the positive third lens group 30 has to be made stronger; on the other hand, it becomes difficult to reduce change in field curvature at the long focal length extremity when focusing is carried out on an object at a short distance.

In the zoom lens system of the present invention, the positive third lens group 30 performs focusing, in which the positive third lens group 30 is moved along the optical axis with respect to a close-distance object in order to obtain an in-focus state of the object. The positive third lens group 30 can be formed from a positive resin single lens element so as to achieve a reduced cost. Furthermore, by forming at least one aspherical surface on the positive third lens group 30 (single biconvex lens 31), it becomes possible to reduce deterioration of optical quality upon focusing toward a close distance.

Specific numerical embodiments will be herein discussed.

In the diagrams of chromatic aberration (axial chromatic aberration) represented by spherical aberration, the solid line and the two types of dotted lines respectively indicate spherical aberrations with respect to the d, g and C lines.

Also, in the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

In the tables, FNO designates the f-number, f designates the focal length of the entire zoom lens system, W designates the half angle-of-view (°), fB designates the back focal distance (the distance from the image-side surface of the most image-side cover glass to the image plane), r designates the radius of curvature, d designates the lens-element thickness or distance between lens elements, Nd designates the refractive index of the d-line, and νd designates the Abbe number.

The values for the distance "d" d which are variable according to FNO designates, f, W, fB and zooming are indicated in the order of the short focal length extremity, an intermediate focal length and the long focal length extremity.

In addition to the above, an aspherical surface which is rotationally symmetrical with respect to the optical axis is defined as follows:

$$x=cy^2/(1+[1-\{1+K\}c^2y^2]^{1/2})+A4y^4+A6y^6+A8y^8+A10y^{10}$$

wherein:

c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

Embodiment 1

Figure 1:
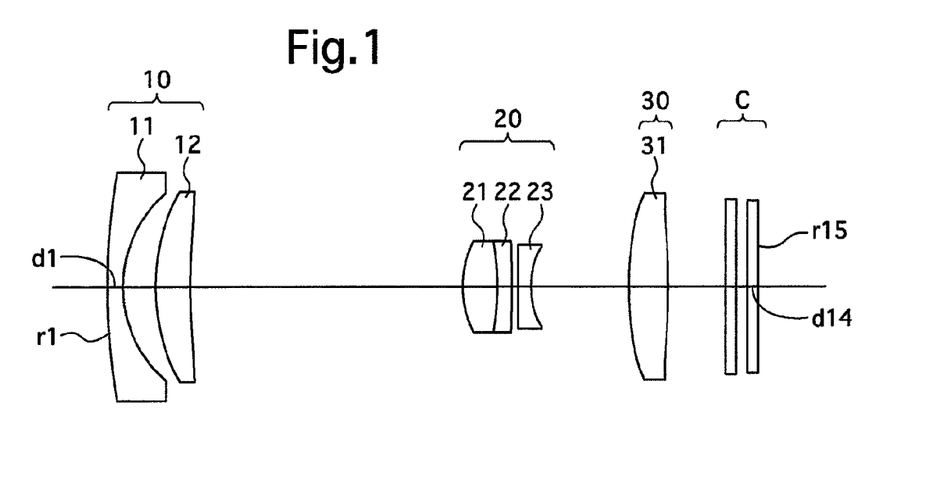
FIG. 1 shows a lens arrangement of a first embodiment of the zoom lens system according to the present invention.
Figures 2A, 2B:
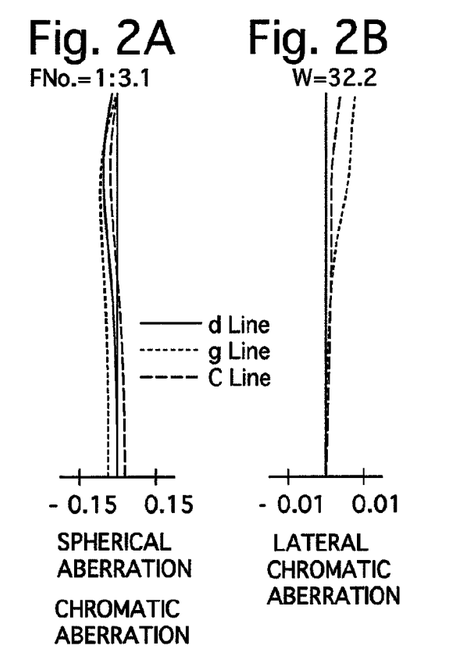
FIGS. 2A, 2B, 2C and 2D show aberrations occurred in the lens arrangement shown in FIG. 1 at the short focal length extremity when an object at infinity is photographed.
Figure 2C:
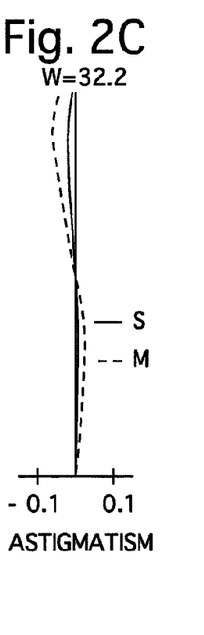
Figure 2D:
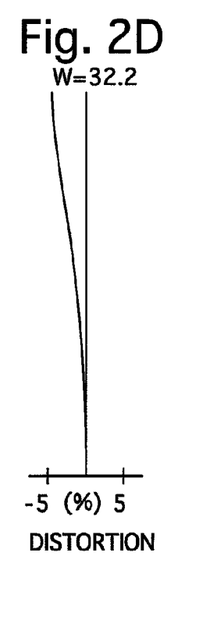
Figures 3A, 3B:
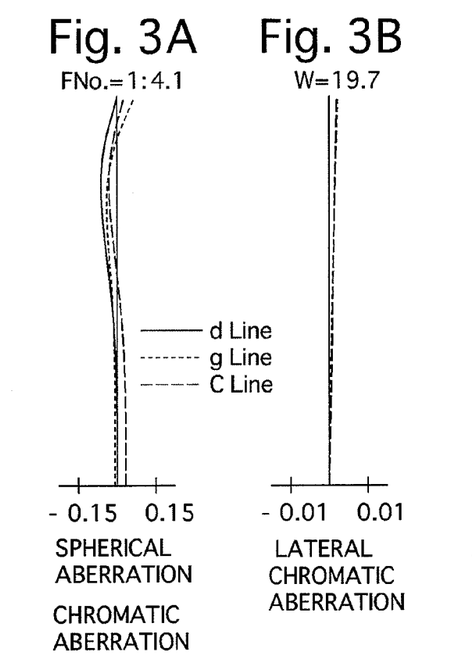
FIGS. 3A, 3B, 3C and 3D show aberrations occurred in the lens arrangement shown in FIG. 1 at an intermediate focal length when an object at infinity is photographed.
Figure 3C:
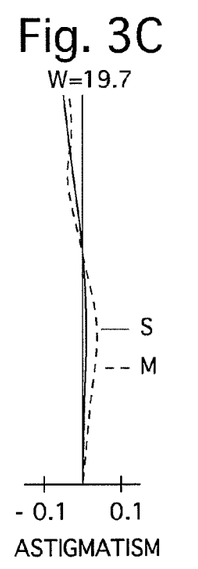
Figure 3D:
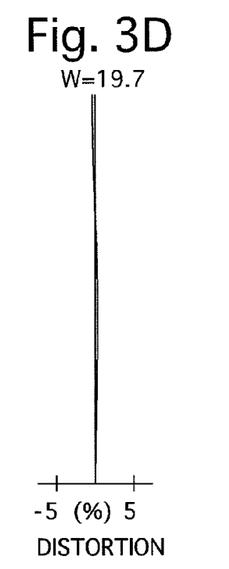
Figures 4A, 4B:
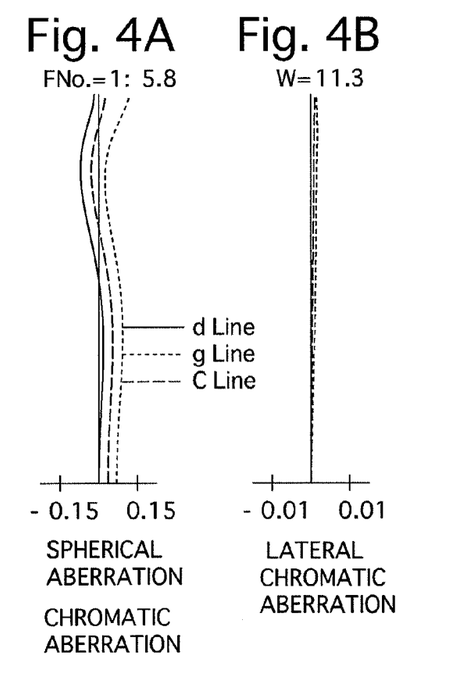
FIGS. 4A, 4B, 4C and 4D show aberrations occurred in the lens arrangement shown in FIG. 1 at the long focal length extremity when an object at infinity is photographed.
Figure 4C:
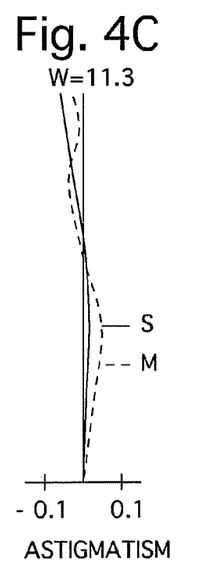
Figure 4D:
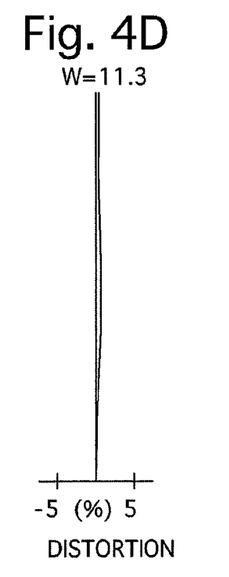

FIG. 1 shows the lens arrangement of the first embodiment of the zoom lens system according to the present invention.

FIGS. 2A through 2D show aberrations occurred in the lens arrangement shown in FIG. 1 at the short focal length extremity when an object at infinity is photographed.

FIGS. 3A through 3D show aberrations occurred in the lens arrangement shown in FIG. 1 at an intermediate focal length when an object at infinity is photographed.

FIGS. 4A through 4D show aberrations occurred in the lens arrangement shown in FIG. 1 at the long focal length extremity when an object at infinity is photographed.

Table 1 shows the numerical data of the first embodiment.

The negative first lens group 10 (surface Nos. 1 through 4) includes a negative meniscus lens element (the negative first lens element) 11 having the convex surface facing toward the object, and a positive meniscus lens element (the positive second lens element) 12 having the convex surface facing toward the object in this order from the object. The positive meniscus lens element 12 is formed from resin, and an aspherical surface is formed on each surface thereof.

The positive second lens group 20 (surface Nos. 5 through 9) includes a biconvex positive lens element (the positive third lens element; the positive first lens element) 21 and a negative meniscus lens element (the negative fourth lens element; the negative second lens element) 22 having the convex surface facing toward the image, and a negative meniscus lens element (the negative fifth lens element; the negative third lens element) 23 having the convex surface facing toward the object, in this order from the object. The biconvex positive lens element 21 and the negative meniscus lens element 22 are cemented to each other, in this order from the object; and the negative meniscus lens element 23 is formed from resin, and has an aspherical surface on each surface thereof.

The positive third lens group 30 (surface Nos. 10 and 11) includes a positive meniscus lens element 31 having the convex surface facing toward the object. The positive meniscus lens element 31 is formed from resin, and has an aspherical surface on each surface thereof.

Surface Nos. 12 through 15 designate a cover glass (filter group) C positioned in front of an imaging device.

TABLE 1

FNO. = 3.1 - 4.1 - 5.8
f = 6.45 - 10.85 - 19.35
W = 32.2 - 19.7 - 11.3
fB = 0.59 - 0.59 - 0.59

| Surf. No. | r | d | Nd | ν |
|---|---|---|---|---|
| 1 | 29.769 | 0.71 | 1.77250 | 49.6 |
| 2 | 5.626 | 1.50 | | |
| 3* | 9.232 | 1.60 | 1.60641 | 27.2 |
| 4* | 27.097 | 12.55 - 5.39 - 0.22 | | |
| 5 | 4.477 | 1.60 | 1.80400 | 46.6 |
| 6 | -12.520 | 0.68 | 1.76182 | 26.5 |
| 7 | -63.993 | 0.29 | | |
| 8* | 50.450 | 0.59 | 1.60641 | 27.2 |
| 9* | 3.787 | 4.52 - 9.12 - 16.10 | | |
| 10* | 15.502 | 1.82 | 1.54358 | 55.7 |
| 11* | 31.504 | 2.64 - 1.90 - 1.70 | | |
| 12 | ∞ | 0.50 | 1.51633 | 64.1 |
| 13 | ∞ | 0.51 | | |
| 14 | ∞ | 0.50 | 1.51633 | 64.1 |
| 15 | ∞ | — | | |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 | A10 |
|---|---|---|---|---|---|
| 3 | 0.00 | $0.11518 \times 10^{-3}$ | $-0.14919 \times 10^{-4}$ | $-0.94880 \times 10^{-7}$ | $0.42624 \times 10^{-7}$ |
| 4 | 0.00 | $-0.19906 \times 10^{-3}$ | $-0.39683 \times 10^{-4}$ | $0.15765 \times 10^{-5}$ | $-0.77703 \times 10^{-8}$ |
| 8 | 0.00 | $-0.33330 \times 10^{-2}$ | $0.64651 \times 10^{-3}$ | $-0.22299 \times 10^{-3}$ | $0.27099 \times 10^{-4}$ |
| 9 | 0.00 | $0.53862 \times 10^{-3}$ | $0.10134 \times 10^{-2}$ | $-0.23292 \times 10^{-3}$ | $0.36678 \times 10^{-4}$ |

-continued

| Surf. No. | K | A4 | A6 | A8 | A10 |
|---|---|---|---|---|---|
| 10 | 0.00 | $-0.20821 \times 10^{-4}$ | $-0.79399 \times 10^{-5}$ | $0.30953 \times 10^{-5}$ | $-0.78260 \times 10^{-7}$ |
| 11 | 0.00 | $0.59918 \times 10^{-3}$ | $-0.11951 \times 10^{-3}$ | $0.10662 \times 10^{-4}$ | $-0.24782 \times 10^{-6}$ |

Embodiment 2

Figure 5:
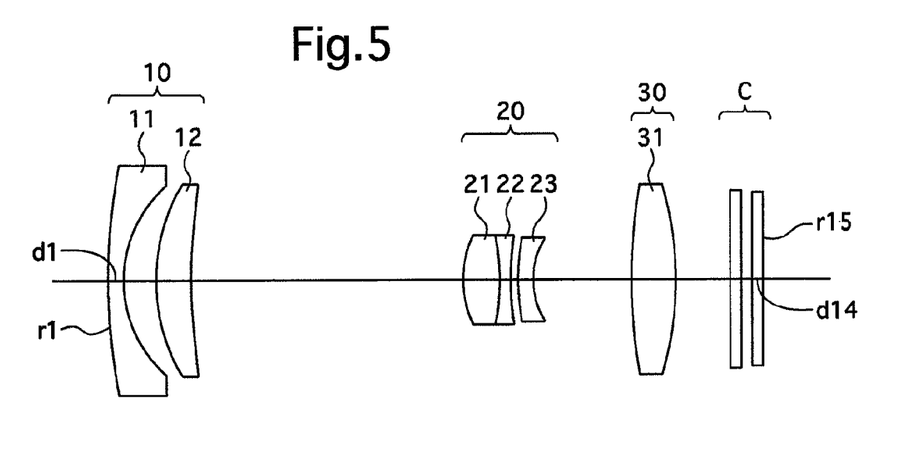
FIG. 5 shows a lens arrangement of a second embodiment of the zoom lens system according to the present invention.
Figure 6A:
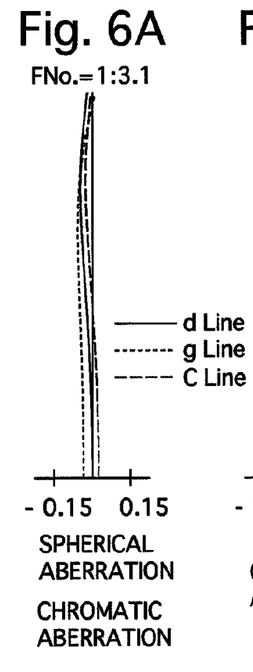
FIGS. 6A, 6B, 6C and 6D show aberrations occurred in the lens arrangement shown in FIG. 5 at the short focal length extremity when an object at infinity is photographed.
Figure 6B:
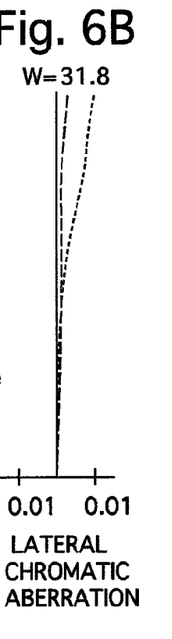
Figure 6C:
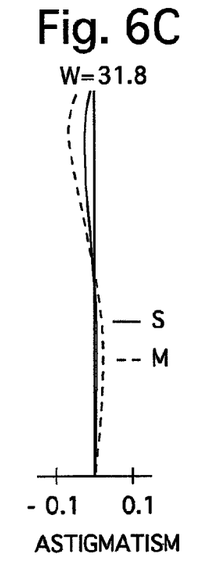
Figure 6D:
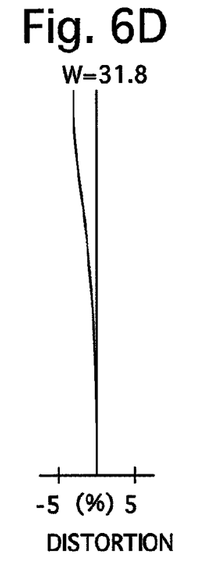
Figures 7A, 7B:
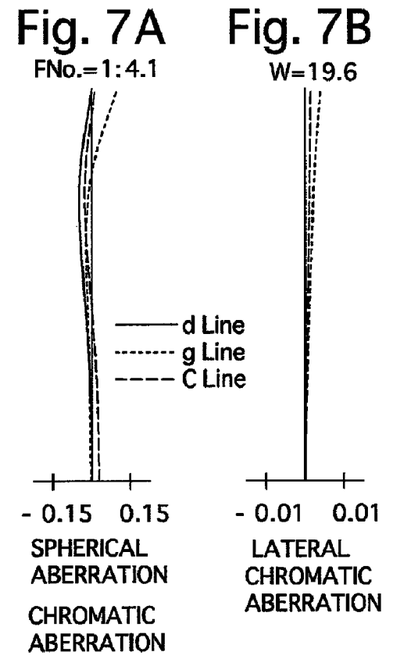
FIGS. 7A, 7B, 7C and 7D show aberrations occurred in the lens arrangement shown in FIG. 5 at an intermediate focal length when an object at infinity is photographed.
Figure 7C:
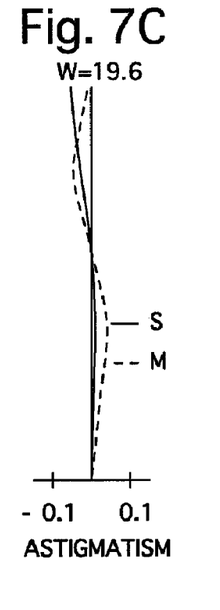
Figure 7D:
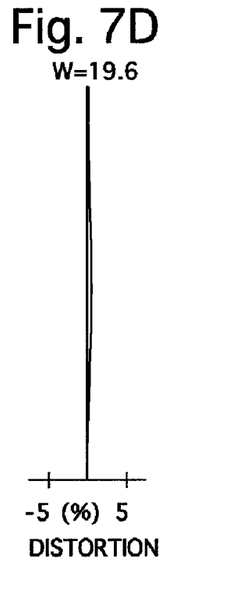
Figure 8A:
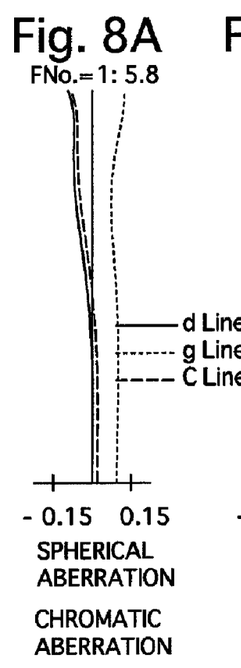
FIGS. 8A, 8B, 8C and 8D show aberrations occurred in the lens arrangement shown in FIG. 5 at the long focal length extremity when an object at infinity is photographed.
Figure 8B:
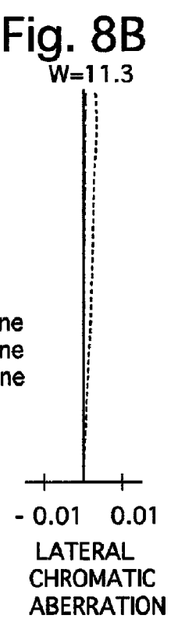
Figure 8C:
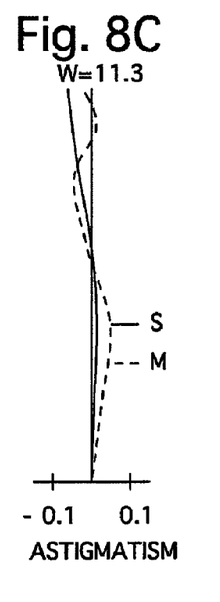
Figure 8D:
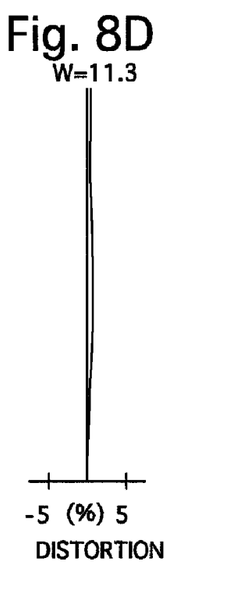

FIG. 5 shows the lens arrangement of the second embodiment of the zoom lens system according to the present invention.

FIGS. 6A through 6D show aberrations occurred in the lens arrangement shown in FIG. 5 at the short focal length extremity when an object at infinity is photographed.

FIGS. 7A through 7D show aberrations occurred in the lens arrangement shown in FIG. 5 at an intermediate focal length when an object at infinity is photographed.

FIGS. 8A through 8D show aberrations occurred in the lens arrangement shown in FIG. 5 at the long focal length extremity when an object at infinity is photographed.

Table 2 shows the numerical data of the second embodiment.

The basic lens arrangement of the second embodiment is the same as that of the first embodiment except that the fourth lens element 22 of the positive second lens group 20 is formed as a negative biconcave lens element, and that the lens element 31 of the positive third lens group 30 is formed as a positive biconvex lens element.

TABLE 2

FNO. = 3.1 - 4.1 - 5.8
f = 6.43 - 10.85 - 19.30
W = 31.8 - 19.6 - 11.3
fB = 0.59 - 0.59 - 0.59

| Surf. No. | r | d | Nd | ν |
|---|---|---|---|---|
| 1 | 27.090 | 0.71 | 1.77250 | 49.6 |
| 2 | 5.700 | 1.50 | | |
| 3* | 8.681 | 1.60 | 1.60641 | 27.2 |
| 4* | 20.781 | 12.49 - 5.24 - 0.12 | | |
| 5 | 4.702 | 1.66 | 1.88300 | 40.8 |
| 6 | −10.135 | 0.50 | 1.76182 | 26.5 |
| 7 | 13.493 | 0.33 | | |
| 8* | 8.924 | 0.70 | 1.63200 | 23.0 |
| 9* | 3.757 | 4.52 - 8.93 - 15.85 | | |
| 10* | 24.361 | 2.02 | 1.54358 | 55.7 |
| 11* | −14.349 | 2.50 - 1.90 - 1.70 | | |
| 12 | ∞ | 0.50 | 1.51633 | 64.1 |
| 13 | ∞ | 0.51 | | |
| 14 | ∞ | 0.50 | 1.51633 | 64.1 |
| 15 | ∞ | — | | |

The symbol * designates the aspherical surface which is rotationally symmetrical with respect to the optical axis.

Aspherical surface data (the aspherical surface coefficients not indicated are zero (0.00)):

Embodiment 3

Figure 9:
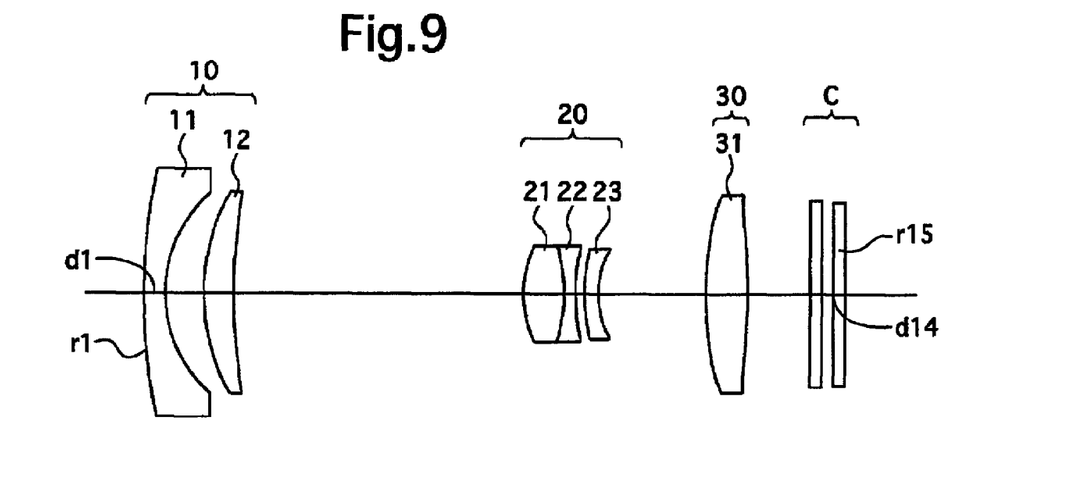
FIG. 9 shows a lens arrangement of a third embodiment of the zoom lens system according to the present invention.
Figures 10A, 10B, 10C:
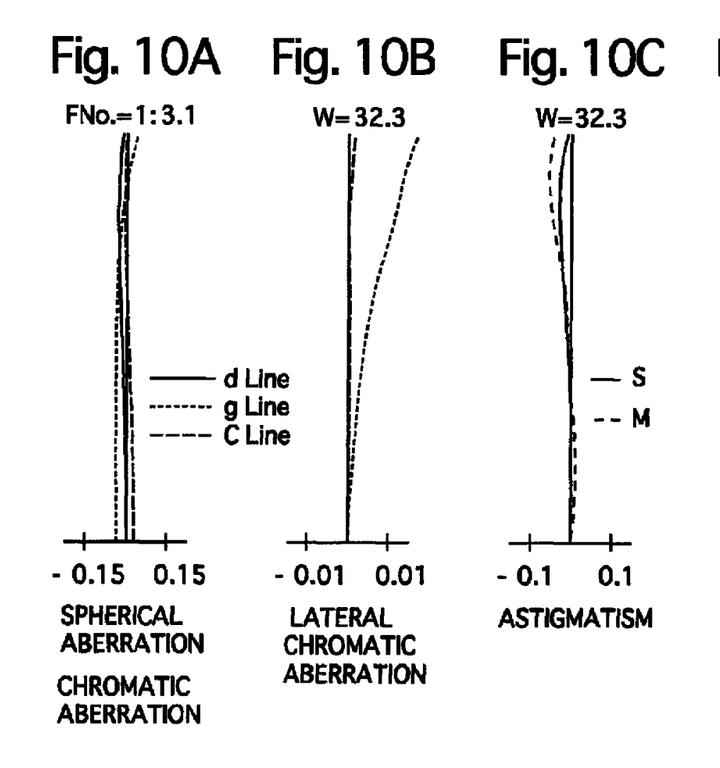
FIGS. 10A, 10B, 10C and 10D show aberrations occurred in the lens arrangement shown in FIG. 9 at the short focal length extremity when an object at infinity is photographed.
Figure 10D:
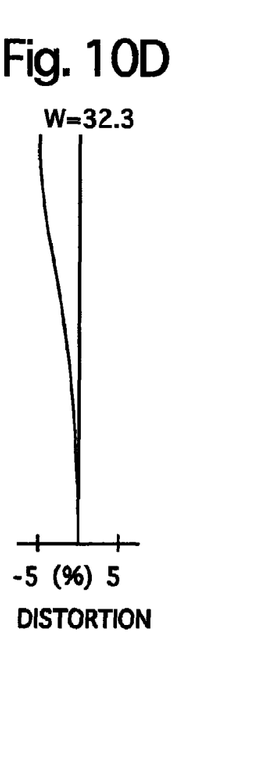
Figures 11A, 11B:
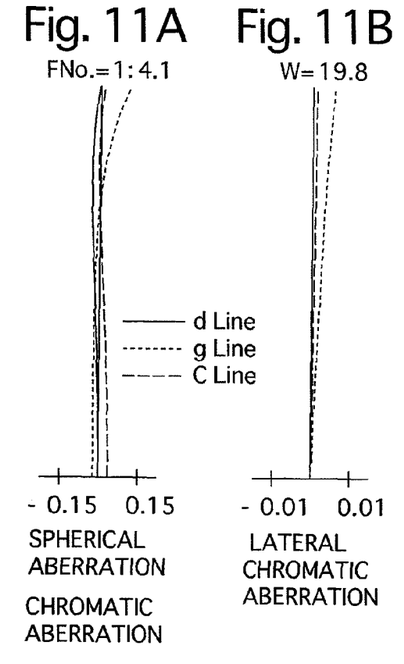
FIGS. 11A, 11B, 11C and 11D show aberrations occurred in the lens arrangement shown in FIG. 9 at an intermediate focal length when an object at infinity is photographed.
Figure 11C:
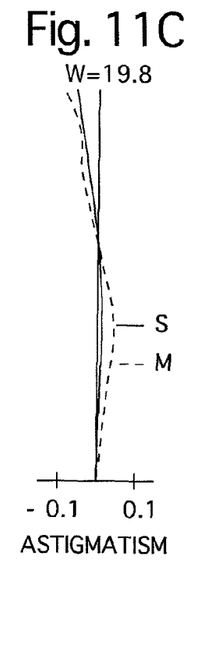
Figure 11D:
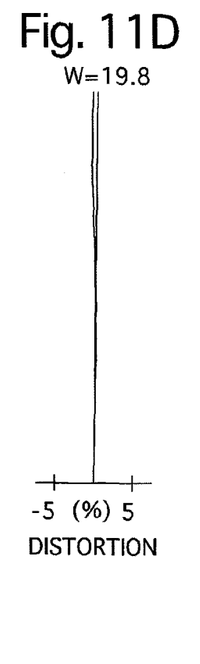
Figures 12A, 12B:
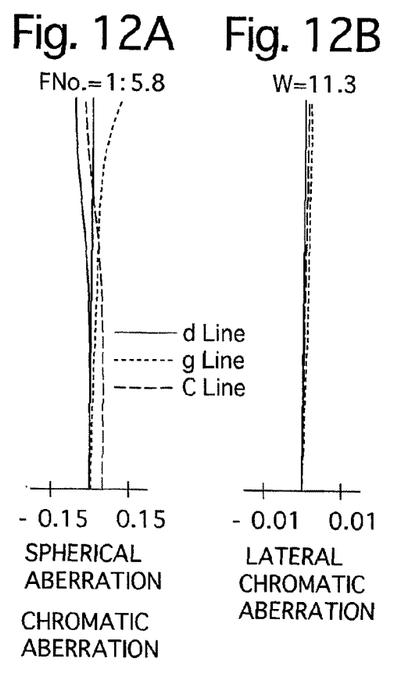
FIGS. 12A, 12B, 12C and 12D show aberrations occurred in the lens arrangement shown in FIG. 9 at the long focal length extremity when an object at infinity is photographed.
Figure 12C:
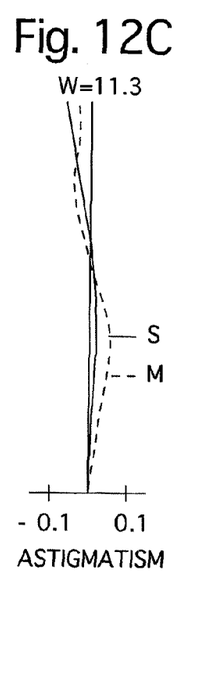
Figure 12D:
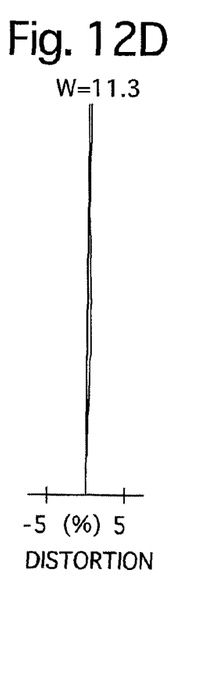

FIG. 9 shows the lens arrangement of the third embodiment of the zoom lens system according to the present invention.

FIGS. 10A through 10D show aberrations occurred in the lens arrangement shown in FIG. 9 at the short focal length extremity when an object at infinity is photographed.

FIGS. 11A through 11D show aberrations occurred in the lens arrangement shown in FIG. 9 at an intermediate focal length when an object at infinity is photographed.

FIGS. 12A through 12D show aberrations occurred in the lens arrangement shown in FIG. 9 at the long focal length extremity when an object at infinity is photographed.

Table 3 shows the numerical data of the third embodiment.

The basic lens arrangement of the third embodiment is the same as that of the first embodiment except that the fourth lens element 22 of the positive second lens group 20 is formed as a negative biconcave lens element.

TABLE 3

FNO. = 3.1 - 4.1 - 5.8
f = 6.45 - 10.85 - 19.35
W = 32.3 - 19.8 - 11.3
fB = 0.59 - 0.59 - 0.59

| Surf. No. | r | d | Nd | ν |
|---|---|---|---|---|
| 1 | 25.788 | 0.90 | 1.77250 | 49.6 |
| 2 | 5.702 | 1.68 | | |
| 3* | 8.818 | 1.28 | 1.63200 | 23.0 |
| 4* | 18.515 | 12.59 - 5.51 - 0.30 | | |
| 5 | 4.804 | 1.75 | 1.88300 | 40.8 |
| 6 | −7.469 | 0.50 | 1.76182 | 26.5 |
| 7 | 9.108 | 0.38 | | |
| 8* | 7.291 | 0.60 | 1.60641 | 27.2 |
| 9* | 4.107 | 4.65 - 9.41 - 16.50 | | |
| 10* | 15.270 | 1.80 | 1.54358 | 55.7 |
| 11* | 29.949 | 2.72 - 1.90 - 1.70 | | |
| 12 | ∞ | 0.50 | 1.51633 | 64.1 |
| 13 | ∞ | 0.51 | | |
| 14 | ∞ | 0.50 | 1.51633 | 64.1 |
| 15 | ∞ | — | | |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 | A10 |
|---|---|---|---|---|---|
| 3 | 0.00 | $0.11231 \times 10^{-3}$ | $-0.62884 \times 10^{-5}$ | $-0.93388 \times 10^{-6}$ | $0.66233 \times 10^{-7}$ |
| 4 | 0.00 | $-0.17472 \times 10^{-3}$ | $-0.32203 \times 10^{-4}$ | $0.74467 \times 10^{-6}$ | $0.22567 \times 10^{-7}$ |
| 8 | 0.00 | $-0.97557 \times 10^{-3}$ | $0.43457 \times 10^{-4}$ | $-0.14610 \times 10^{-3}$ | $0.22044 \times 10^{-4}$ |
| 9 | 0.00 | $0.27062 \times 10^{-2}$ | $0.42798 \times 10^{-3}$ | $-0.19849 \times 10^{-3}$ | $0.36073 \times 10^{-4}$ |
| 10 | 0.00 | $-0.41052 \times 10^{-4}$ | $-0.33360 \times 10^{-5}$ | $0.41743 \times 10^{-5}$ | $-0.12454 \times 10^{-6}$ |
| 11 | 0.00 | $0.73675 \times 10^{-3}$ | $-0.14720 \times 10^{-3}$ | $0.11081 \times 10^{-4}$ | $-0.26831 \times 10^{-6}$ |

| Surf. No. | K | A4 | A6 | A8 | A10 |
|---|---|---|---|---|---|
| 3 | 0.00 | $-0.93530 \times 10^{-4}$ | $0.12224 \times 10^{-4}$ | $-0.27347 \times 10^{-5}$ | $0.13395 \times 10^{-6}$ |
| 4 | 0.00 | $-0.36452 \times 10^{-3}$ | $-0.71702 \times 10^{-5}$ | $-0.14273 \times 10^{-5}$ | $0.10184 \times 10^{-6}$ |
| 8 | 0.00 | $-0.13958 \times 10^{-2}$ | $0.13231 \times 10^{-3}$ | $-0.16234 \times 10^{-3}$ | $0.17368 \times 10^{-4}$ |
| 9 | 0.00 | $0.22235 \times 10^{-2}$ | $0.62606 \times 10^{-3}$ | $-0.27026 \times 10^{-3}$ | $0.34271 \times 10^{-4}$ |
| 10 | 0.00 | $-0.37982 \times 10^{-3}$ | $0.23461 \times 10^{-5}$ | $0.36148 \times 10^{-5}$ | $-0.93545 \times 10^{-7}$ |
| 11 | 0.00 | $0.51583 \times 10^{-4}$ | $-0.94812 \times 10^{-4}$ | $0.10725 \times 10^{-4}$ | $-0.25365 \times 10^{-6}$ |

Embodiment 4

Figure 13:
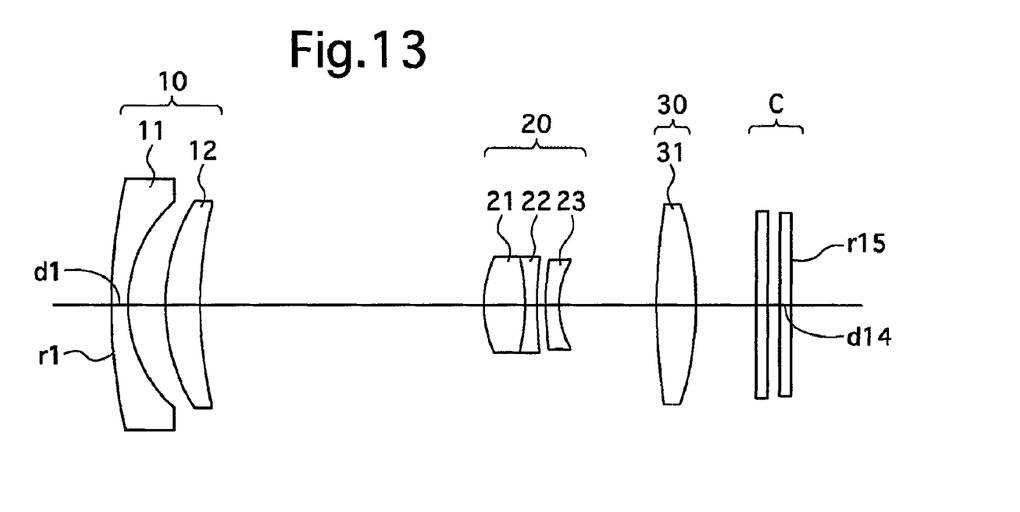
FIG. 13 shows a lens arrangement of a fourth embodiment of the zoom lens system according to the present invention.
Figures 14A, 14B:
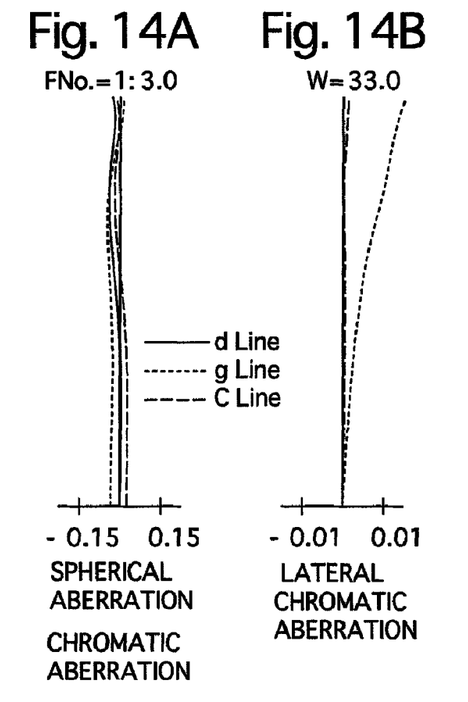
FIGS. 14A, 14B, 14C and 14D show aberrations occurred in the lens arrangement shown in FIG. 13 at the short focal length extremity when an object at infinity is photographed.
Figure 14C:
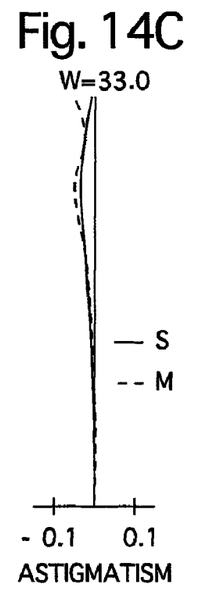
Figure 14D:
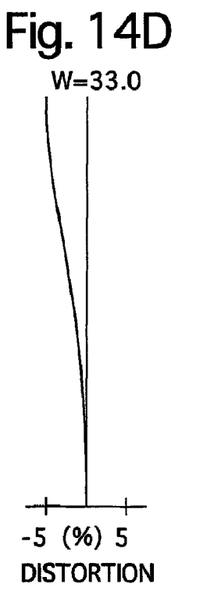
Figures 15A, 15B:
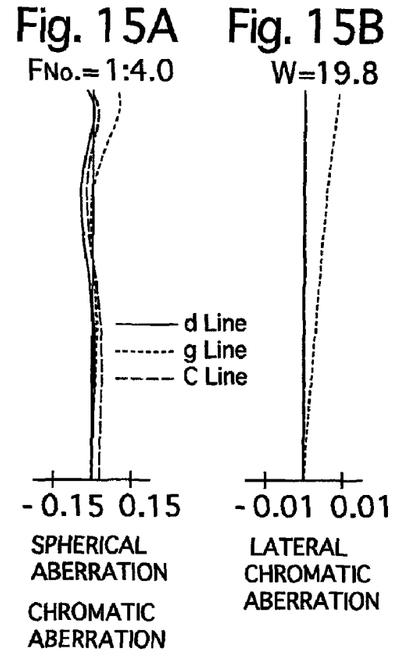
FIGS. 15A, 15B, 15C and 15D show aberrations occurred in the lens arrangement shown in FIG. 13 at an intermediate focal length when an object at infinity is photographed.
Figure 15C:
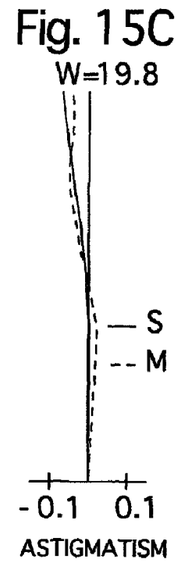
Figure 15D:
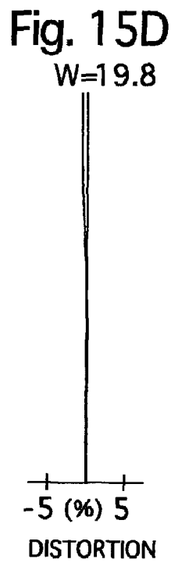
Figures 16A, 16B:
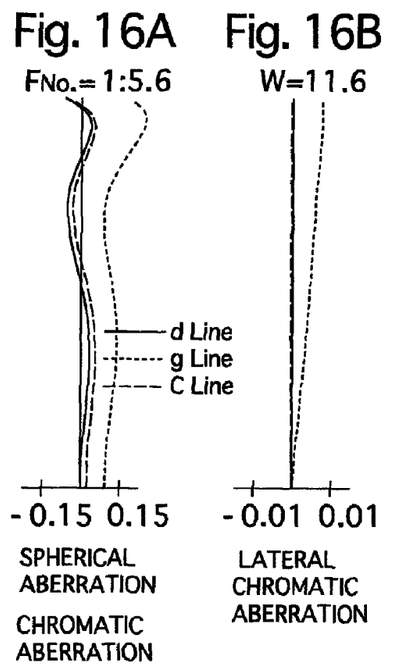
FIGS. 16A, 16B, 16C and 16D show aberrations occurred in the lens arrangement shown in FIG. 13 at the long focal length extremity when an object at infinity is photographed.
Figure 16C:
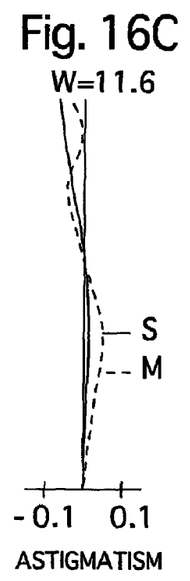
Figure 16D:
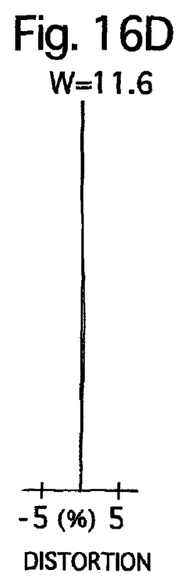

FIG. 13 shows the lens arrangement of the fourth embodiment of the zoom lens system according to the present invention.

FIGS. 14A through 14D show aberrations occurred in the lens arrangement shown in FIG. 13 at the short focal length extremity when an object at infinity is photographed.

FIGS. 15A through 15D show aberrations occurred in the lens arrangement shown in FIG. 13 at an intermediate focal length when an object at infinity is photographed.

FIGS. 16A through 16D show aberrations occurred in the lens arrangement shown in FIG. 13 at the long focal length extremity when an object at infinity is photographed.

Table 4 shows the numerical data of the fourth embodiment.

The basic lens arrangement of the fourth embodiment is the same as that of the second embodiment.

Embodiment 5

Figure 17:
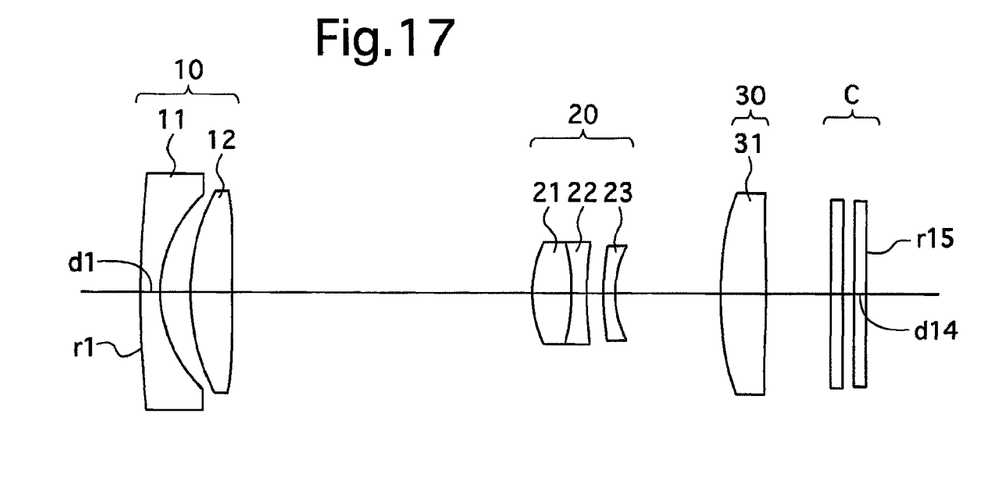
FIG. 17 shows a lens arrangement of a fifth embodiment of the zoom lens system according to the present invention.
Figures 18A, 18B:
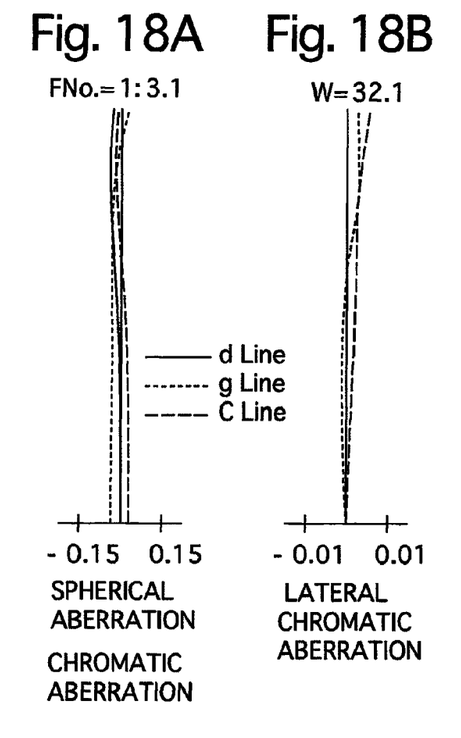
FIGS. 18A, 18B, 18C and 18D show aberrations occurred in the lens arrangement shown in FIG. 17 at the short focal length extremity when an object at infinity is photographed.
Figure 18C:
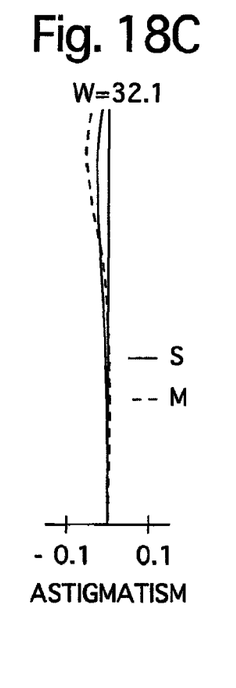
Figure 18D:
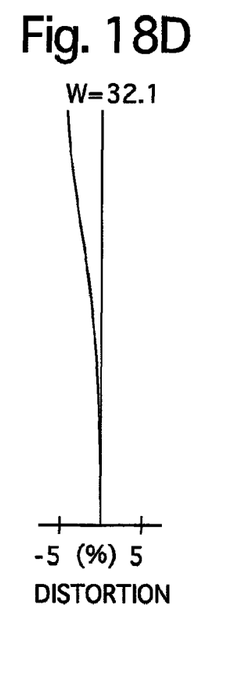
Figures 19A, 19B:
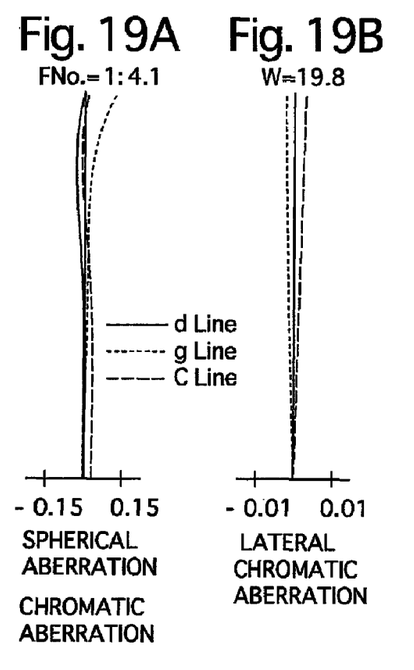
FIGS. 19A, 19B, 19C and 19D show aberrations occurred in the lens arrangement shown in FIG. 17 at an intermediate focal length when an object at infinity is photographed.
Figure 19C:
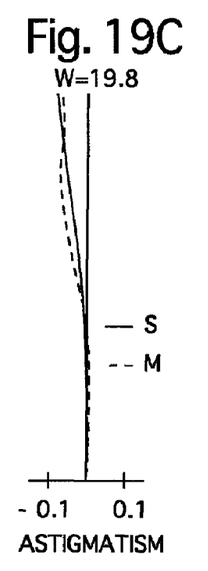
Figure 19D:
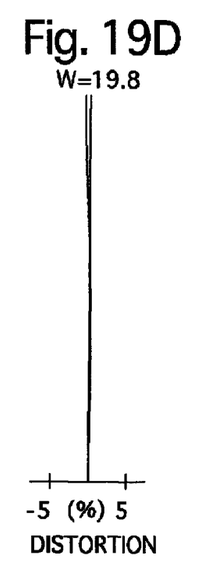
Figures 20A, 20B:
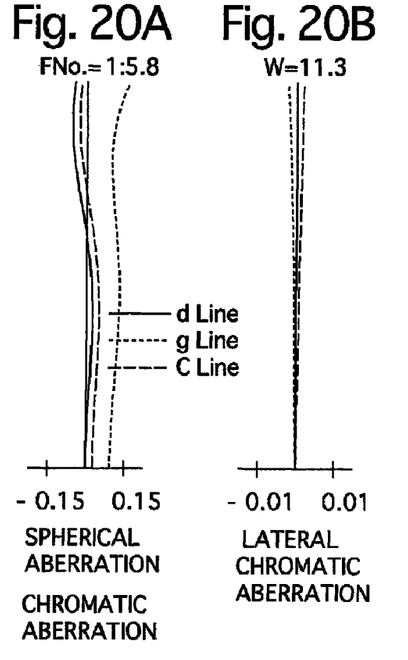
FIGS. 20A, 20B, 20C and 20D show aberrations occurred in the lens arrangement shown in FIG. 17 at the long focal length extremity when an object at infinity is photographed.
Figure 20C:
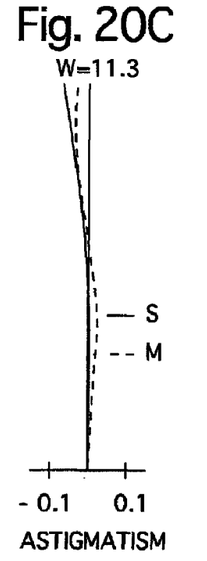
Figure 20D:
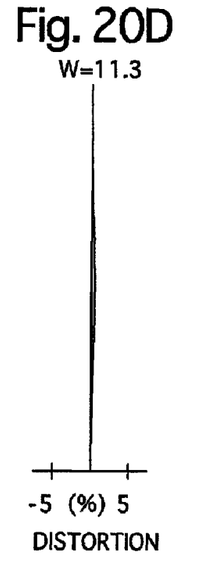

FIG. 17 shows the lens arrangement of the fifth embodiment of the zoom lens system according to the present invention.

FIGS. 18A through 18D show aberrations occurred in the lens arrangement shown in FIG. 17 at the short focal length extremity when an object at infinity is photographed.

FIGS. 19A through 19D show aberrations occurred in the lens arrangement shown in FIG. 17 at an intermediate focal length when an object at infinity is photographed.

FIGS. 20A through 20D show aberrations occurred in the lens arrangement shown in FIG. 17 at the long focal length extremity when an object at infinity is photographed.

Table 5 shows the numerical data of the fifth embodiment.

The basic lens arrangement of the fifth embodiment is the same as that of the second embodiment except that the second lens element 12 of the negative first lens group 10 is a biconvex lens element.

TABLE 4

FNO. = 3.0 - 4.0 - 5.6
f = 6.30 - 10.85 - 18.89
W = 33.0 - 19.8 - 11.6
fB = 0.59 - 0.59 - 0.59

| Surf. No. | r | d | Nd | ν |
|---|---|---|---|---|
| 1 | 23.882 | 0.70 | 1.77250 | 49.6 |
| 2 | 5.840 | 1.62 | | |
| 3* | 8.361 | 1.49 | 1.63200 | 23.0 |
| 4* | 14.614 | 12.24 - 5.09 - 0.36 | | |
| 5 | 4.697 | 1.77 | 1.88300 | 40.8 |
| 6 | −9.069 | 0.50 | 1.76182 | 26.5 |
| 7 | 15.470 | 0.38 | | |
| 8* | 10.876 | 0.59 | 1.63200 | 23.0 |
| 9* | 3.955 | 4.23 - 8.88 - 15.40 | | |
| 10* | 21.862 | 1.69 | 1.54358 | 55.7 |
| 11* | −16.673 | 2.62 - 1.90 - 1.70 | | |
| 12 | ∞ | 0.50 | 1.51633 | 64.1 |
| 13 | ∞ | 0.51 | | |
| 14 | ∞ | 0.50 | 1.51633 | 64.1 |
| 15 | ∞ | — | | |

The symbol * designates the aspherical surface which is rotationally symmetrical with respect to the optical axis.

Aspherical surface data (the aspherical surface coefficients not indicated are zero (0.00)):

TABLE 5

FNO. = 3.1 - 4.1 - 5.8
f = 6.45 - 10.85 - 19.35
W = 32.1 - 19.8 - 11.3
fB = 0.59 - 0.59 - 0.59

| Surf. No. | r | d | Nd | ν |
|---|---|---|---|---|
| 1 | 44.708 | 0.86 | 1.88300 | 40.8 |
| 2 | 5.594 | 1.26 | | |
| 3* | 9.805 | 1.79 | 1.60641 | 27.2 |
| 4* | −431.893 | 12.77 - 5.53 - 0.30 | | |
| 5 | 4.959 | 1.67 | 1.88300 | 40.8 |
| 6 | −9.114 | 0.65 | 1.80518 | 25.4 |
| 7 | 14.146 | 0.70 | | |
| 8* | 11.369 | 0.50 | 1.60641 | 27.2 |
| 9* | 4.649 | 4.51 - 9.32 - 16.47 | | |
| 10* | 16.718 | 1.93 | 1.54358 | 55.7 |
| 11* | −41.284 | 2.78 - 1.90 - 1.70 | | |
| 12 | ∞ | 0.50 | 1.51633 | 64.1 |
| 13 | ∞ | 0.51 | | |
| 14 | ∞ | 0.50 | 1.51633 | 64.1 |
| 15 | ∞ | — | | |

The symbol * designates the aspherical surface which is rotationally symmetrical with respect to the optical axis.

Aspherical surface data (the aspherical surface coefficients not indicated are zero (0.00)):

| Surf. No. | K | A4 | A6 | A8 | A10 |
|---|---|---|---|---|---|
| 3 | 0.00 | $-0.97580 \times 10^{-4}$ | $-0.84596 \times 10^{-5}$ | $-0.26292 \times 10^{-6}$ | $0.53175 \times 10^{-7}$ |
| 4 | 0.00 | $-0.36397 \times 10^{-3}$ | $-0.20857 \times 10^{-5}$ | $0.77876 \times 10^{-6}$ | $0.27840 \times 10^{-7}$ |
| 8 | 0.00 | $-0.23530 \times 10^{-2}$ | $0.11651 \times 10^{-2}$ | $-0.63739 \times 10^{-3}$ | $0.99856 \times 10^{-4}$ |
| 9 | 0.00 | $0.17509 \times 10^{-2}$ | $0.14398 \times 10^{-2}$ | $-0.68857 \times 10^{-3}$ | $0.13010 \times 10^{-3}$ |
| 10 | 0.00 | $0.45973 \times 10^{-3}$ | $-0.42921 \times 10^{-4}$ | $0.64782 \times 10^{-5}$ | $-0.20012 \times 10^{-6}$ |
| 11 | 0.00 | $-0.47593 \times 10^{-4}$ | $-0.13251 \times 10^{-3}$ | $0.12461 \times 10^{-4}$ | $-0.32817 \times 10^{-6}$ |

| Surf. No. | K | A4 | A6 | A8 | A10 |
|---|---|---|---|---|---|
| 3 | 0.00 | $0.24409 \times 10^{-3}$ | $-0.18974 \times 10^{-5}$ | $-0.25861 \times 10^{-6}$ | $0.22287 \times 10^{-7}$ |
| 4 | 0.00 | $-0.26934 \times 10^{-3}$ | $-0.11659 \times 10^{-4}$ | $-0.67269 \times 10^{-7}$ | $0.17042 \times 10^{-8}$ |
| 8 | 0.00 | $0.60799 \times 10^{-4}$ | $-0.18751 \times 10^{-3}$ | $-0.41067 \times 10^{-4}$ | $0.48219 \times 10^{-5}$ |
| 9 | 0.00 | $0.42010 \times 10^{-2}$ | $-0.10048 \times 10^{-3}$ | $0.21174 \times 10^{-4}$ | $0.25633 \times 10^{-6}$ |
| 10 | 0.00 | $0.45177 \times 10^{-3}$ | $-0.53144 \times 10^{-4}$ | $0.49966 \times 10^{-5}$ | $-0.10826 \times 10^{-6}$ |
| 11 | 0.00 | $0.97248 \times 10^{-3}$ | $-0.14316 \times 10^{-3}$ | $0.10781 \times 10^{-4}$ | $-0.22940 \times 10^{-6}$ |

The numerical values of each condition for each embodiment are shown in Table 6.

TABLE 6

|  | Embod. 1 | Embod. 2 | Embod. 3 | Embod. 4 | Embod. 5 |
|---|---|---|---|---|---|
| Cond. (1) | 2.70 | 2.72 | 2.52 | 2.50 | 2.24 |
| Cond. (2) | 0.53 | 0.60 | 0.55 | 0.56 | 0.47 |
| Cond. (3) | 1.804 | 1.883 | 1.883 | 1.883 | 1.883 |
| Cond. (4) | -1.51 | -0.94 | -0.62 | -0.97 | -0.78 |
| Cond. (5) | 27.2 | 23.0 | 27.2 | 23.0 | 27.2 |
| Cond. (6) | 1.066 | 1.065 | 1.075 | 1.072 | 1.065 |

As can be understood from Table 6, the first through fifth embodiments satisfy conditions (1) through (6). Furthermore, as can be understood from the aberration diagrams, the various aberrations are suitably corrected.

According to the present invention, a negative-lead type zoom lens system, which includes three lens groups, and has a zoom ratio of approximately 3 can cover a zooming range from the wide-angle extremity (the short focal length extremity) to the telephoto extremity (the long focal length extremity), can be achieved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprises a negative first lens group, a positive second lens group, and a positive third lens group, in this order from an object,
   wherein each of said negative first lens group, said positive second lens group and said positive third lens group moves along the optical axis upon zooming;
   wherein said positive second lens group comprises a positive first lens element, a negative second lens element, and a negative third lens element, in this order from the object; and
   wherein said zoom lens system satisfies the following conditions:

$2 < f2/rb < 3$ $0.4 < f2/f3 < 0.8$ wherein
   f2 designates the focal length of said positive second lens group;
   f3 designates the focal length of said positive third lens group; and
   rb designates the radius of curvature of the image-side surface of said negative third lens element of said positive second lens group.

2. The zoom lens system according to claim 1, wherein said zoom lens system satisfies the following condition:

$1.8 < n1$ wherein
   n1 designates the refractive index of the d-line of said positive first lens element of said positive second lens group.

3. The zoom lens system according to claim 1, wherein said zoom lens system satisfies the following conditions:

$-2 < f2/fa < -0.5$ $vd < 28$ wherein
   fa designates the focal length of said negative third lens element of said positive second lens group; and
   vd designates the Abbe number of said negative third lens element of said positive second lens group.

4. The zoom lens system according to claim 1, wherein both surfaces of said negative third lens element of said positive second lens group are made aspherical.

5. The zoom lens system according to claim 1, wherein upon zooming from the short focal length extremity to the long focal length extremity, said positive third lens group is monotonically moved toward an image, and satisfies the following condition:

$1.05 < m3t/m3w < 1.3$ wherein
   m3t designates the image-forming magnification of said positive third lens group at the long focal length extremity when the object at infinity is in an in-focus state; and
   m3w designates the image-forming magnification of said positive third lens group at the short focal length extremity when the object at infinity is in an in-focus state.

6. The zoom lens system according to claim 1, wherein said positive third lens group comprises a biconvex single lens element that is made from resin, and functions as a focusing lens group that is arranged to move, in the optical axis direction, for bringing an object in an in-focus state.

7. An electronic imaging apparatus comprising an imaging device on which an image is formed by the zoom lens system according to claim 1.

* * * * *